Sept. 10, 1963 F. B. STENCEL 3,103,331
AERIAL RECOVERY SYSTEMS
Filed Feb. 23, 1962 4 Sheets-Sheet 3
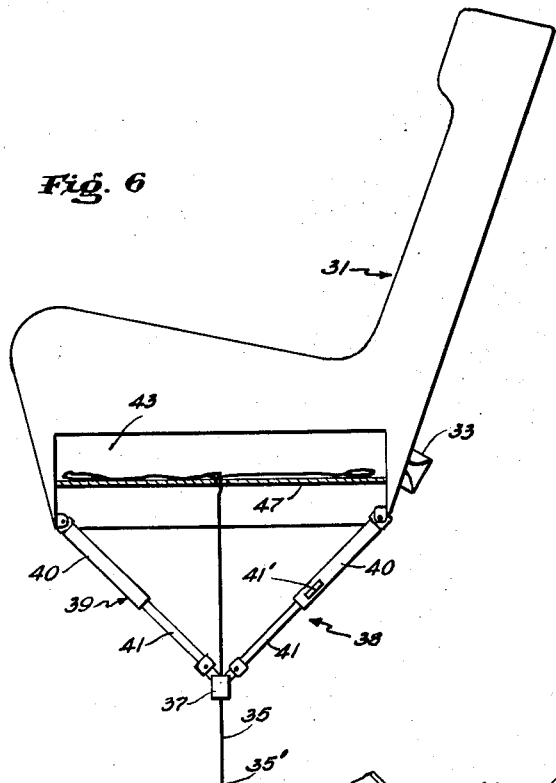
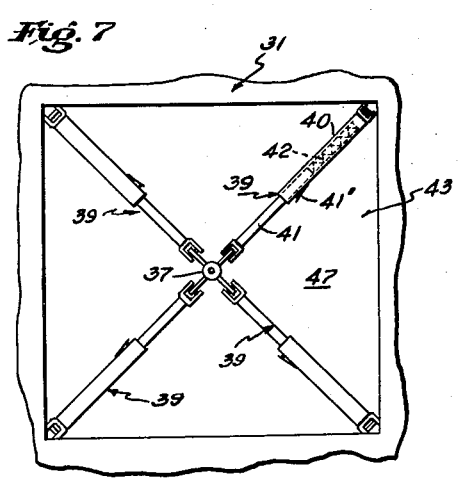
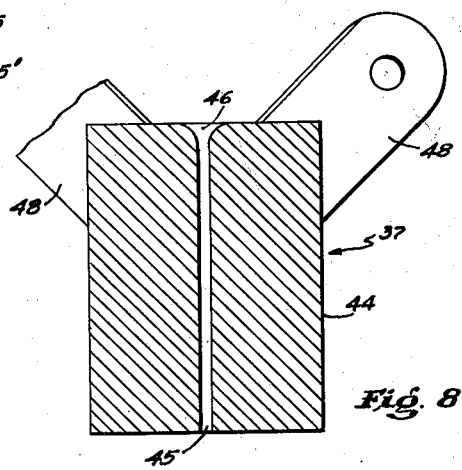
INVENTOR
FRED B. STENCEL
BY *Arnold and Roylance*
ATTORNEYS Sept. 10, 1963    F. B. STENCEL    3,103,331
AERIAL RECOVERY SYSTEMS
Filed Feb. 23, 1962    4 Sheets-Sheet 4
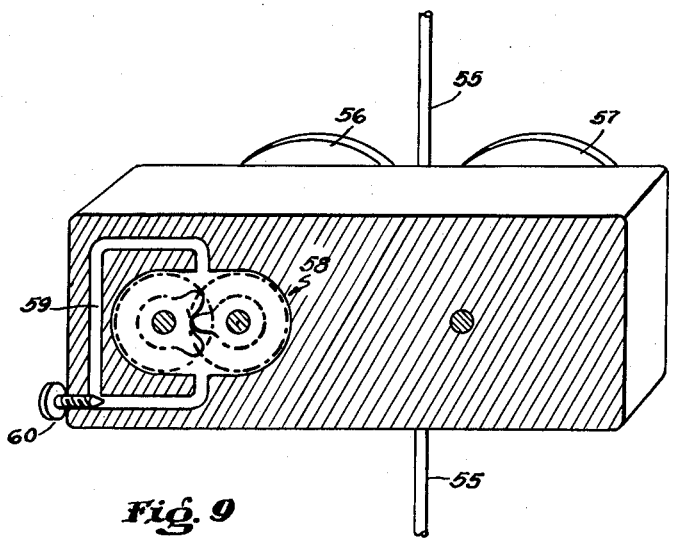
Fig. 9
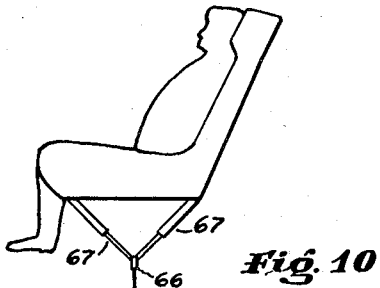
Fig. 10
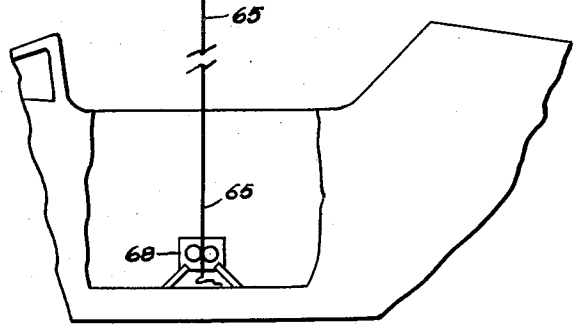
INVENTOR
FRED B. STENCEL
BY *Arnold & Roylance*
ATTORNEYS

United States Patent Office 3,103,331
Patented Sept. 10, 1963

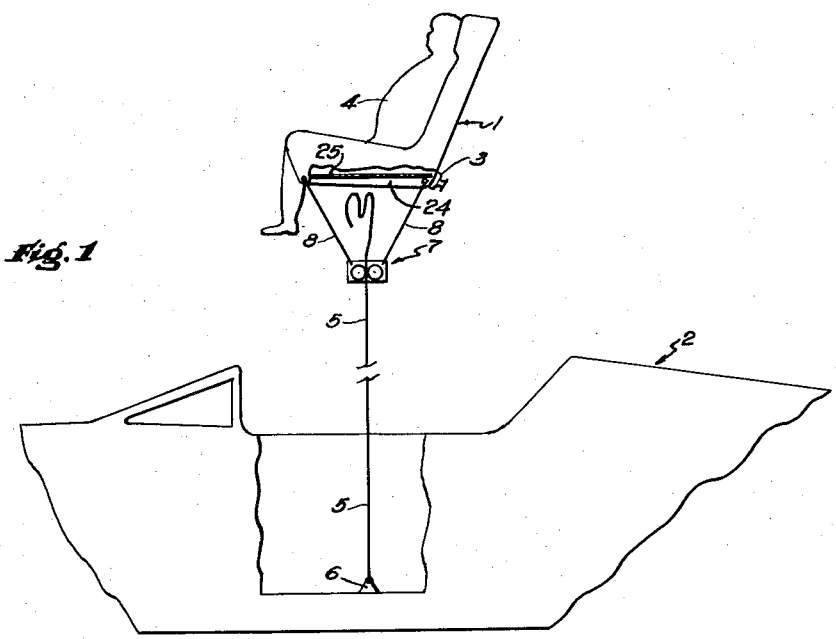
Fig. 1
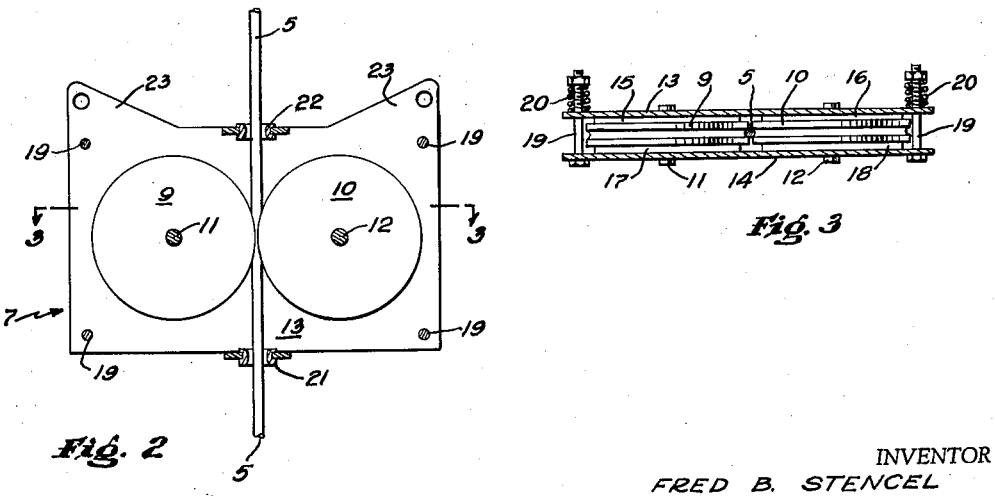
Fig. 2
Fig. 3
INVENTOR
FRED B. STENCEL

3,103,331
AERIAL RECOVERY SYSTEMS
Fred B. Stencel, Asheville, N.C., assignor to Stencel Aero Engineering Corporation, Asheville, N.C., a corporation of North Carolina
Filed Feb. 23, 1962, Ser. No. 174,995
7 Claims. (Cl. 244—122)

This invention relates to the art of recovering loads from aircraft and is especially applicable to aerial recovery systems of the type wherein an ejection seat, a projected capsule, or any other form of load is first separated from the aircraft and then recovered by parachute.

It has become common practice to provide, in connection with modern aircraft of various types, a recovery system by which the pilot, for example, can be forcibly separated from the aircraft at the time recovery is required. In the recovery systems most frequently encountered, an ejection seat is employed which is capable of being first ejected from the aircraft, as by means of an explosive charge, and then projected a substantial distance away from the aircraft, as by a reaction motor device such as a rocket. When the ejection seat has travelled an adequate distance from the aircraft, the pilot can release himself, or is automatically released by a timer, from the seat for normal recovery by parachute, or the entire ejection seat, still carrying the pilot, can be recovered by parachute.

Such recovery systems are called into use most frequently when the aircraft is in motion. Hence, some additional means is required to stabilize the ejection seat in a given attitude at the time the actual recovery by parachute is to be initiated. To accomplish such stabilization, the ejection seat (or its equivalent structure) is equipped with a drogue parachute effective to bring the seat to the desired attitude, assuming that the speed of the aircraft at the time of the attempted recovery is adequate to cause the canopy of the drogue parachute to fill and provide the necessary drag. Unfortunately, recovery is frequently required when conditions are not suitable for proper operation of the drogue parachute as, for example, when the speed of the aircraft is too low.

This problem of failure of the drogue parachute to act effectively is complicated by an additional factor. If the drogue parachute does not become promptly effective after separation of the load from the aircraft, there is a distinct tendency for the load to tumble so that, when the drogue parachute does come into action, its lines may already have been fouled as a result of the tumbling action. In the case of an ejection seat which is projected away from the aircraft by means of a rocket, the effect of the rocket frequently acts in a positive manner to cause tumbling of the seat.

The rocket which acts to project the ejection seat provides thrust which, because of the mounting of the rocket, acts in a predetermined line which is fixed relative to the seat. If the line of thrust passes through the center of gravity of the mass involved, including both the seat and its occupant, then the thrust tends to drive the seat in a given line without rotation of the seat during its travel. If, on the other hand, the thrust line does not pass through the center of gravity, a turning moment results and the seat rotates. For practical purposes, the center of gravity in question cannot be predetermined precisely, since the size and weight of the occupant of the seat is not known precisely at the time the seat is designed. In most instances, the thrust line of the rocket employed to project the seat is offset from the center of gravity of the seat and its occupant. Typically, the thrust line is offset from the center of gravity, either above or below, by as much as an inch or more. It is accordingly reasonably certain that, when the rocket becomes active, after ejection of the seat, the rocket thrust will not only project the seat but also cause it to rotate during its projected travel. If the drogue parachute is not then in truly effective action, there is no stabilizing force effective to restrain the seat against rotation. Under these circumstances, the rotation of the seat can cause the shroud lines of the drogue parachute to wrap around or become entangled about the seat. When this occurs, not only is the ejection seat not in its proper attitude at the time of final escape of the pilot, but also such escape is made difficult or impossible because of the tangle presented by the parachute lines.

As a general proposition, it appears that the ejection seat systems heretofore proposed are not truly operative when the aircraft is travelling at speeds below 50 m.p.h. at altitudes involving normal air densities, because of the difficulties discussed above. At high altitudes, where low air densities may render a drogue parachute ineffective even at relatively high speeds, it is obvious that the systems proposed by the prior art are similarly ineffective.

Another difficulty encountered with aerial recovery systems involving rocket projection arises from the fact that the human body can withstand greater forces applied transversely to the spine than is possible when the forces are axial to the spine. Thus, an average person can withstand forces up to only about 20G axially of the spine, but up to 60G transverse to the spine. Accordingly, it is desirable to construct ejection seats and the like in such fashion that the thrust of the projection rocket is maintained transverse to the spine of the occupant.

A general object of the present invention is to provide aerial recovery systems of the type referred to in which the load is automatically stabilized, after being separated from the aircraft, even though the conditions at the time of recovery are not conducive to proper operation of a drogue parachute.

Another object is to device an effective stabilizer for ejection seats and the like which are subjected to a substantial projection thrust for a material time period.

A further object is to provide a truly safe and dependable aerial recovery system of the type described.

Yet another object is to provide such a system, employing an ejection seat or equivalent load-bearing structure, wherein the load-bearing structure is brought to a given desired attitude at the time of actual recovery, i.e., escape of a person by parachute.

A still further object is to devise such a system wherein the projected load-bearing structure can be brought to zero speed at the final escape time.

Another object is to provide an aerial recovery system of the type wherein the load-bearing structure is projected away from the aircraft by a reaction motor device, characterized by the ability of employing greater projection accelerations without damage to persons or other loads being recovered.

In order that the manner in which these and other objects are attained in accordance with the invention can be understood in detail, reference is had to the accompanying drawings, which form a part of this specification, and wherein:

FIG. 1 is a side elevational view illustrating an aircraft ejection seat equipped with a stabilizing device constructed in accordance with one embodiment of the invention, the seat being shown in a stabilized position during its projected travel away from the aircraft;

FIG. 2 is a vertical sectional view, with some parts shown in elevation, of a slip line brake employed in the device of FIG. 1;

FIG. 3 is a transverse sectional view taken on line 3—3, FIG. 2;

FIG. 6 is a side elevational view of an aircraft ejection seat equipped with a stabilizing device constructed in accordance with another embodiment of the invention, certain parts of the stabilizing device being shown in extended positions below the ejection seat;

FIG. 7 is a bottom plan view of the ejection seat of FIG. 6, showing certain parts of the stabilizing device in collapsed, stored condition;

FIG. 8 is an enlarged, fragmentary vertical sectional view of a slip line brake employed in the stabilizing device of FIGS. 6 and 7;

FIG. 9 is a perspective view, partly in vertical section, of another slip line brake useful in accordance with the invention; and FIG. 10 is a side elevational view illustrating a modification of the invention as shown in FIG. 1;

Figure 4:
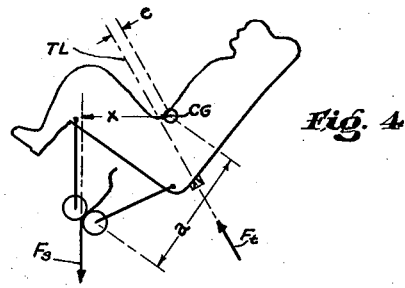
FIG. 4 is a diagram illustrating the relationship of projection and stabilizing forces applied to the ejection seat of FIG. 1.

Considered broadly, the invention achieves the aforementioned objects by providing the combination of a slip line and brake so associated with the load to be recovered that the line and brake coact to apply to the load, after it is separated from the aircraft, a stabilizing force effective to bring the load to a desired predetermined attitude.

In a particularly advantageous embodiment, the invention employs a slip line having one end connected to the aircraft, the slip line running through a braking means attached to the ejection seat by mounting means so constructed that, after the seat is ejected, the braking means is disposed below the seat and, therefore, considerably below the center of gravity of the total projected mass. During projection of the seat, the slip line is drawn through the braking means, the free end of the slip line ultimately passing therethrough. The braking means acts on the slip line to generate a restraining force applied to the seat via the mount for the braking means. Should there be no turning moments acting on the seat, the seat will simply follow its intended path of projection, its travel being only slightly restrained by the action of the braking means and the slip line. Should a turning moment be effective on the seat, however, the seat then tends to rotate about the center of gravity of the combined mass, such rotary movement being imparted to the braking means via the brake mounting means. As soon as the point of engagement between the braking means and the slip line tends to swing away from the line of projected travel of the seat, the restraining force established by the braking means and slip line acts to oppose the turning moment, and the seat is brought to stabilized condition.

The slip line is of such length as to extend for at least a substantial portion of the intended distance over which the seat is to be projected. The device can be so constructed that the slip line "runs out" before the seat reaches the projected position at which the person occupying the seat is to make his final escape, stabilization of the seat being accomplished during that portion of the projected travel of the seat in which the projecting rocket delivers substantial thrust. Alternatively, the slip line can be of such length as to "run out" substantially at the time the ejection seat reaches minimum speed. While it is particularly useful to have one end of the slip line attached to the aircraft, while the braking means is carried by the seat, it is also possible to attach one end of the slip line to the ejection seat, the braking means then being mounted on the aircraft. In both cases, the other end of the slip line is free. Before projection of the seat, the braking means engages the slip line near the attached end thereof, the major portion of the slip line being stored to run out through the braking means.

Referring now to the drawings in detail, and first to FIGS. 1–3 thereof, it will be seen that this embodiment of the invention involves an ejection seat 1 normally mounted in an aircraft 2. The ejection seat may be of any conventional type and employs an ejecting mechanism (not shown), ordinarily explosively operated, the purpose of the ejecting mechanism being to effectively remove the seat from within the aircraft. Mounted at the bottom of the back of the ejection seat is a projection rocket 3 which is aligned with the center line of the seat and arranged to deliver thrust along a line passing through the approximate position of the center of gravity of the total projected mass, including the seat, the occupant of the seat, and any auxiliary devices, such as the drogue parachute, occupant's parachute, etc., which are projected with the seat.

Use of both an ejection mechanism and the projection rocket 3 is necessary because the orientation of the seat relative to the aircraft usually requires that the ejection force be applied in a direction which is at least generally axial with respect to the spine of the occupant 4 of the seat. The forces which can be withstood by a person in this axial direction are not adequate to propel the seat sufficiently far from the aircraft to assure safe escape of the occupant. Hence, the projection rocket 3, acting in a direction across the occupant's spine, is employed to accelerate the seat, after ejection thereof from the aircraft, and propel the seat to the point of final escape of the occupant 4.

The projection rocket 3 is, of course, fixedly mounted on seat 1 and is so oriented that the thrust provided by the rocket will extend along a line passing through the general location of the center of gravity of the combined projected mass. The precise location of the center of gravity is not, however, predictable at the time of construction of the seat, since the weight and proportions of the occupant are not then known. Accordingly, the line of thrust of projection rocket 3 will normally be offset from the center of gravity of the combined projected mass by a distance such as is indicated at $e$ in FIG. 4. Under normal circumstances, considering projection seats presently employed, the projecting rocket 3 may be a solid propellant rocket having a burning time of 0.36 second, for example. Typically, projection thrusts on the order of 4,000 lbs. are involved. Considering such burning times and thrust magnitudes, it is obvious that even a relatively small offset between the thrust line of the projection rocket and the center of gravity of the projected mass is bound to result in a substantial turning moment applied to the ejection seat.

Assuming that the seat is ejected while the aircraft is travelling at a substantial speed, such as a speed in excess of 100 m.p.h., it is obvious that the usual drogue parachute (not shown) will be aerodynamically effective to stabilize the ejection seat, even in view of the turning moment resulting from the offset of the thrust line of the projection rocket from the center of gravity. At low speeds, however, such as speeds below 50 m.p.h., it is obvious that the drogue parachute will not be aerodynamically effective and will not, in fact, become deployed by the time the projection rocket is in action. Accordingly, rotation of the seat is bound to occur, with the result that the lines for the drogue parachute will wrap around the seat or around the occupant's legs and so entangle the occupant that he may not be able to escape from the seat at all.

In this embodiment of the invention, a slip line 5 is employed, one end of the slip line being fixedly attached to the aircraft, as by means of a suitable fixture 6, FIG. 1. The slip line extends through a braking device, indicated generally at 7, the remaining end of the slip line being free and unattached. Braking device 7 is mounted on seat 1 by a plurality of flexible cables 8, each cable 8 having one end attached to a different corner of the bottom of seat 1 and the other end attached to brake 7. The cables 8 are of similar length, the length being such that, after ejection of the seat, brake 7 depends from the bottom of the seat, as will be clear in FIG. 1, and is therefore spaced a substantially greater distance from the center of gravity of the projected mass than is the thrust line of the projection rocket 3. As will be clear from later discussion, the cables 8 combine to act as a bridle which not only mounts the brake 7 on the seat but also provides a means via which the restraining action provided by the brake is applied to the seat.

In this embodiment of the invention, brake 7 comprises two opposed rollers 9 and 10 having their respective supporting shafts 11 and 12 journaled in suitable bearing openings in two parallel frame plates 13 and 14, as seen in FIG. 3. Frame plate 13 has securely fixed thereto a pair of friction discs 15 and 16 which are centered respectively with shafts 11 and 12 and therefore positioned to frictionally brake the rollers 9 and 10, respectively, when plates 13 and 14 are urged together to bring the friction discs into engagement with the rollers. Plate 14 carries a second pair of friction discs 17 and 18 respectively positioned to coact with rollers 9 and 10. Frame plates 13 and 14 are generally rectangular and are provided with openings at each corner. Bolts 19 extend through aligned pairs of these openings and are each equipped with a compression spring 20 so that plates 13 and 14 are urged toward each other by the action of the four compression springs. Hence, springs 20 are effective to bring the friction discs 15–18 into good frictional engagement with the side faces of the respective rollers 9 and 10.

Frame plate 13 carries a guide eye 21, disposed at the bottom of the brake device, while frame plate 14 carries a similar guide eye 22, located at the top of the brake. The two guide eyes are aligned approximately in the common plane of rollers 9 and 10 and are effective to guide the slip line 5 along a path between the two opposed rollers.

Rollers 9 and 10 have grooved peripheries which are roughened in order to obtain good frictional engagement with the slip line 5. The space between the bearing openings for roller shafts 11 and 12 is such that, considering the dimensions of the rollers, the grooved peripheries of the two rollers will oppose each other, at a point centered between the two roller shafts, in such fashion as to define an opening through which slip line 5 can run, this opening having a diameter slightly smaller than the diameter of the slip line. The slip line advantageously is a braided wire or nylon cable capable of being forced between the two opposing rollers so that the grooved peripheries of both rollers positively and frictionally engage the slip line. Accordingly, if the slip line is now drawn through the brake device, the rollers will necessarily be caused to turn against the braking action afforded by the friction discs 15–18.

Each of the frame plates 13 and 14 is provided with an integrally formed attaching ear 23 having an opening through which the end of the corresponding one of mounting cables 8 is run, the cable ends being secured in a loop in any suitable fashion, as shown in FIG. 2. Thus, the mounting cables 8 each extend from a corner of the bottom of seat 1 to a corresponding corner of braking device 7. Since the cables 8 are flexible, braking device 7, and the free portion of slip line 5, can be stored in the space 24 beneath seat 1 prior to ejection of the seat from the aircraft. Upon ejection of the seat, however, the weight of the braking device, plus the engagement of the braking device with slip line 5 at a point near the end of the slip line which is attached to the aircraft, causes braking device 7 to be displaced downwardly from the seat until mounting cables 8 are taut. At this stage in the operation of the system, it is advantageous to have the free portion of the slip line confined in such fashion that it cannot interfere with proper operation of the braking device or of other components of the aerial recovery system. Typically, a removable supporting plate 25 is provided across the storage space at the bottom of the ejection seat, plate 25 being provided with an opening through which the free portion of the slip line extends, and the free portion of the slip line being disposed on the plate (prior to ejection of the seat) in any suitable folded configuration.

In FIG. 4, the combination of seat 1, projection rocket 3, slip line 5, brake 7 and mounting cables 8 is shown diagrammatically. Here $F_t$ represents the thrust of rocket 3, and it will be seen that this force is applied along line TL which is determined by the design and disposition of rocket 3, line TL being displaced below the center of gravity CG of the combined mass by a distance $e$. Considering the mounting cables 8 to be fully, and therefore equally, extended brake 7 is spaced from the center of gravity by a distance $a$. Hence, assuming for purposes of simplicity of discussion that cables 8 are rigid, the restraining force $F_s$ afforded by coaction of the slip line and brake is applied along the direction of the length of the stretched slip line, and acts through moment arm $x$.

Assume the rocket thrust to be 4,000 lbs., a distance $e$ to be 1.2 ins., and distance $x$ to be 20 ins. For the condition of static rotation equilibrium of the projected mass:

(1) $$(F_t)(e) = (F_s)(x)$$

and $$F_s = \frac{(e)(F_t)}{x}$$

Substituting the assumed values, $$F_s = \frac{(1.2)(4000)}{20} = 240 \text{ lbs.}$$

Considering the dynamic characteristics of the device, it can be seen that the seat can tend to overshoot the equilibrium position, depending upon the position at which cables 8 support the brake 7 and upon the time during projected travel of the seat, when the slip line disengages from the brake.

If the invention were not employed, and the seat were not equipped with a drogue parachute, still assuming that the thrust line TL is displaced from the center of gravity by 1.2 ins., and further assuming that the polary moment of inertia B of the total projected mass is 14 ft. lbs./sec.$^2$, and that the projection rocket has a burning time of 0.36 sec., then the seat is angularly displaced by 110° at burnout of the rocket 3 and has a rate of rotation at burnout of 600°/sec.

The response time of the system described with reference to FIGS. 1 and 4 can be related to the oscillation period T, determined as follows:

(2) $$T = 2\pi \sqrt{\frac{B}{(F_s)(a)}}$$

From the foregoing discussion of FIGS. 1–4 and Equation 1, and giving consideration to the size and mass of typical ejection seats and occupants, it will be apparent that the distance $a$ can be longically selected as 3.5 ft., for example, and the system can be designed to make $F_s = 300$ lbs. Substituting those values in Equation 2, and taking B as 14 ft. lbs./sec.$^2$, the oscillation period T becomes 0.72 sec. Thus, with rocket 3 having a burning time of 0.36 sec., it is apparent that the disturbing moment resulting from the action of the projection rocket exists for only half of the oscillation period.

Figure 5:
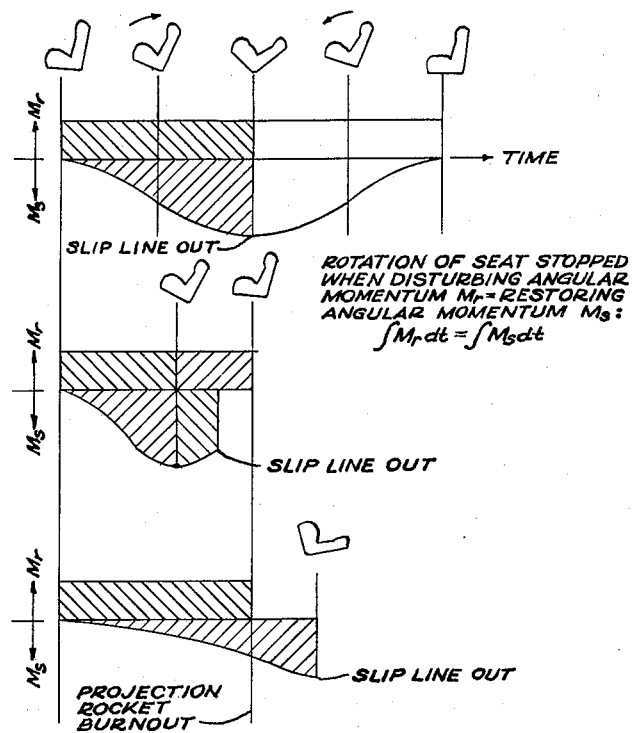
FIG. 5 is a chart further illustrating the manner of operaion of the stabilizing device of FIG. 1.

From the chart of FIG. 5, it will be seen that there are three general cases for obtaining dynamic equilibrium of the system to stop rotation of the projected mass. In Case 1, the length of the slip line 5 is so selected that the line runs out of the brake 7 at the time of burnout of projection rocket 3. The restoring angular moment applied by coaction of the slip line and brake is such that rotation of the seat 1 is stopped substantially at burnout of the projection rocket. In Case 2, the length of slip line 5 is so selected that the line runs out of brake 7 well before burnout of the rocket occurs, and the value of $(F_g)(a)$ is made substantially greater than in Case 1. In Case 2, the slip line and brake coact first to stop rotation of the seat caused by the disturbing moment resulting from the rocket, and then to reverse the rotation of the seat so that, when equilibrium is finally reached, the attitude of the seat is more nearly that which existed when the projection rocket was fired. In Case 3, the length of the slip line is so selected that the line runs out of the brake a substantial time after burnout of the projection rocket, and the value of $(F_s)(a)$ is made substantially less than in Case 1. In this case, rotation of the seat is not stopped until well after burnout, and there is accordingly a greater total rotational displacement of the attitude of the seat. In view of the alignment of the thrust line TL of rocket 3, it is apparent that Case 3 provides an increased component of vertical thrust, as compared to Cases 1 and 2.

In considering the three general cases illustrated in FIG. 5, it is to be noted that the invention allows rotation of the seat to be stopped at any of various points during oscillation period, and also allows the attitude displacement of the seat to be predetermined substantially as desired, both results being accomplished by selection of (1) the length of the slip line relative to burning time of the projection rocket, and (2) the value of $(F_s)(a)$. The value of $(F_s)(a)$ depends upon the design of the mounting means for the brake and upon the braking action.

The embodiment of the invention shown in FIGS. 6-8 is chosen to illustrate both a modified form of mounting means for the brake and a different type of braking device. Here, projection seat 31 is equipped with a conventional ejection gun (not shown) and projection rocket 33, the rocket 33 being mounted at the back of the seat near the bottom thereof and oriented so that its exhaust is projected downwardly and rearwardly relative to the seat. The slip line 35 again has one end attached to the aircraft (not shown) and extends through braking device 37, the remaining end of the slip line being free. The braking device 37 is mounted on the bottom of seat 31 by a collapsible mounting structure 38, shown extended in FIG. 6 and collapsed in FIG. 7.

The mounting structure 38 comprises four telescopic legs each having a base portion 40, pivoted to a different corner of the bottom of the seat, and a tip portion 41 slidable within and projecting from the base portion. Each leg 39 includes a compression spring 42 disposed within portion 40 of the leg in such fashion as to urge tip portion 41 to its fully projected position. A spring-loaded pin 41', mounted on the outside of each leg portion 40 and disposed to extend through a suitable opening therein, is provided to engage across the inner end of the corresponding tip portion 41 whenever the leg structure is completely extended to the condition illustrated in FIG. 6. The latching action thus provided by pins 41' prevents the extended mounting structure from being collapsed. The free end of each tip portion 41 is pivoted to braking device 37. Since the four legs are both pivotally mounted and telescopic, the combination of the legs and braking device can be swung to stored position, as shown in FIG. 7, and are held in this position, against the action of springs 42, so long as the seat remains properly mounted in the aircraft. Thus, mounting structure 38 can be collapsed and stored within space 43, provided at the bottom of the seat, being held therein by engagement with a portion of the aircraft, such as the cockpit floor, until the seat is ejected.

In this embodiment of the invention, slip line 35 is in the form of a solid annealed metal wire of uniform diameter. Braking device 37 consists of an integral block 44 of metal provided with an axial bore 45. Bore 45 includes a tapered entrance throat 46 and, throughout the remainder of its length, is of uniform circular transverse cross-section slightly smaller than the diameter of the slip line.

In assembling the system for use, the end 35' of the slip line which is to be attached to the aircraft is first pulled through bore 45, entering via throat 46. This can be accomplished by providing end 35' with a tapered tip capable of being threaded through the bore manually until the tip projects below block 44 sufficiently to be gripped by a suitable pulling tool. Enough of the slip line is then pulled through the block to allow proper attachment of the end 35' to the aircraft. When the system is thus installed, most of the length of the slip line extends beyond block 44 and is store in space 43 above the mounting structure 38. Thus, the free portion of the slip line can be lead through a suitable opening in supporting plate 47 and arranged on the supporting plate in any suitable fashion conducive to free running of the slip line during projection of the seat.

At its upper end, block 44 is provided with four upwardly projecting mounting ears 48 spaced symmetrically about the axis of bore 45. Each mounting ear is provided with an aperture accommodating a pivot pin secured to the bifurcated free end of the tip portion 41 of a different one of telescopic mounting legs 39.

It will be apparent that block 44, with its bore 45, serves as a drawing die and that, upon ejection and projection of seat 31, the annealed wire slip line 35 is drawn through the die block. The drawing force required to reduce the diameter of the annealed wire provides the desired braking action, the braking force being applied to seat 31 through the rigid mounting structure 38 with the latter automatically assuming its extended position, as seen in FIG. 6, upon ejection of the seat from the aircraft. It will be noted that the mounting structure 38, unlike mounting cables 8, FIG. 1, has the advantage of providing a substantially rigid connection via which the braking force is transferred to the seat.

In this embodiment, the restraining force applied to seat 31 during projection thereof by rocket 33 can be predetermined by design of mounting structure 38, selection of the relative diameters of the slip line and die bore, and selection of the characteristics of the annealed wire employed for the slip line.

The braking devices employed in the embodiments of the invention described above can be replaced by a type of brake capable of providing the desired restraining force as the slip line is drawn therethrough. Thus, for example, a rotary fluid brake such as that shown in FIG. 9 can be employed. Here, the slip line 55 is gripped between opposed rollers 56 and 57, roller 56 being fixed to the shaft of one of the gears or a gear pump 58. Movement of the slip line through the braking device accordingly drives the gear pump to force fluid through the closed path provided by duct 59. A needle valve or the like 60 is provided to establish an adjustable orifice in duct 59. In operation, the torque required to force the fluid through the closed path provides a restraining force on the driven gear of the pump, which force opposes rotation of roller 56 and thus restrains the slip line.

Where the combination of slip line and brake is to act between the load and aircraft, the fixed end of the slip line can be attached to the load, rather than to the aircraft. In FIG. 10, for example, one end of slip line 65 is fixedly attached to a fitting 66 at the free ends of pivoted, telescopic legs 67, the latter being identical with legs 39, FIGS. 6-8. Braking device 68 is rigidly mounted on the aircraft, the free end of the slip line being run through the braking device and stored in any suitable fashion on the aircraft.

While certain advantageous embodiments of the invention have been chosen for illustration, it will be under-

I claim:

1. In a load recovery system of the type described, the combination of a load carrier adapted to be supported in predetermined position on a craft capable of flight;

power means operatively coupled to said load carrier and operative to generate force to project said load carrier away from the supporting craft, in a predetermined direction of travel relative to the craft, when recovery is to be accomplished, said power means being so arranged relative to said load carrier that the line of the force generated thereby may, depending upon the particular load, be offset from the center of gravity of the combination of said load carrier and the load so that application of force by said power means to said load carrier produces a rotational impulse tending to cause said load carrier to rotate during its projected travel; and stabilizing means for automatically opposing said rotational impulse during the projected travel of said load carrier, said stabilizing means comprising a yieldable brake and line assembly interconnecting the craft and said said load carrier, said brake and line assembly being so connected to said load carrier that the effective point of attachment between the brake and line assembly and said load carrier is offset from said center of gravity to provide a moment arm through which the restraining force afforded by said brake and line assembly is applied to said load carrier, the direction of the offset of said point of attachment being generally rearwardly, relative to said predetermined direction of said projected travel, from said center of gravity whereby said moment arm effectively increases as said load carrier begins to traverse the first 90° of the rotation of said load carrier caused by the force applied by said power means.

2. A load recovery system in accordance with claim 1 and wherein said load carrier is an ejection seat, said recovery system further comprising extensible means by which said brake and line assembly is connected to said seat, said extensible means being connected to the lower portion of said seat and having both a collapsed position, for storage prior to projection of said seat, and an extended position in which said extensible means trails said seat during projected travel thereof.

3. In a load recovery system of the type described, the combination of a load carrier adapted to be supported in a predetermined position on a craft capable of flight;

power means operatively coupled to said load carrier and effective to generate force to project said load carrier away from the supporting craft when recovery is to be accomplished, said power means being so arranged relative to said load carrier that the line of force generated thereby may, depending upon the particular load, be offset from the center of gravity of the combination of said load carrier and the load so that application of force by said power means to said load carrier produces a rotational impulse tending to cause said load carrier to rotate during its projected travel; and stabilizing means for automatically opposing said rotational impulse during the projected travel of said load carrier, said stabilizing means comprising a yieldable brake and line assembly connected to the craft, and extensible means connecting said brake and line assembly to said load carrier, said extensible means being convertible from a collapsed position for storage prior to projection of said load carrier, to an extended position in which the effective point of connection of said brake and line assembly to said load carrier is offset rearwardly from said center of gravity, relative to the direction of said projected travel, whereby the restraining force afforded by said brake and line assembly is applied to said load carrier through a moment arm established by said extensible means, which moment arm effectively increases as said load carrier begins to traverse the first 90° of rotation caused by the force applied by said power means.

4. In an aerial recovery system of the type described wherein a load carrier is first separated from the aircraft which initially supports the same and then recovered by parachute, the combination of a slip line of substantial length;

brake means constructed to be engaged with said slip line to resist movement of said slip line relative to said brake means; and telescopic mounting means attached at one end to said brake means, the other end of said telescopic mounting means being adapted for attachment to the load carrier, said mounting means being extendable from a collapsed condition, for storage prior to projection of the load carrier, to a projected position, when projection of the load carrier commences, said slip line being adapted to have one of its ends attached to an element of the recovery system other than the load carrier which is displaced by a substantial distance from the load carrier during operation of the recovery system, said brake means engaging said slip line adjacent said one end thereof before operation of the recovery system, operation of the recovery system causing said slip line to be drawn through said brake means against the restraining effect afforded thereby, said brake means being disposed at a point spaced from the center of gravity of the load carrier when said telescopic mounting means is extended, whereby the restraining force afforded by said brake means is applied to the load carrier through a predetermined moment arm and therefore urges the load carrier toward a given attitude during operation of the recovery system.

5. The invention defined in claim 4 wherein said mounting means comprises resilient means biasing said telescopic means toward its projected position.

6. For use in an aerial recovery system of the type comprising an ejection seat equipped with means for ejecting the seat from an aircraft and rocket means for projecting the ejected seat to a substantial distance from the aircraft, the rocket means being oriented to supply projection thrust transverse to the occupant of the seat, the combination of a slip line of such length as to be capable of extending from the aircraft over at least a substantial portion of the distance to be transversed by the ejection seat;

brake means constructed to be engaged with said slip line to resist movement of said slip line relative to said brake means; and mounting means for attaching said brake means to the ejection seat in such fashion that said brake means depends below the ejection seat during its projected travel, said mounting means comprising a telescopic structure attached at one end to the ejection seat and at the other end to said brake means, said telescopic structure being extendable from a collapsed position, for storage prior to ejection of the seat, to an extended position in which the brake means is disposed below the seat, when ejection occurs, one end of said slip line being adapted for attachment to the aircraft, said brake means engaging said slip line adjacent said one end thereof before the ejection seat is ejected from the aircraft, ejection and projection of the ejection seat causing said slip line to be drawn through said brake means against the restraining force afforded thereby, the restraining force afforded by said brake means being effective, when applied to the ejection seat via said mounting means, to stabilize the ejection seat during its projected travel.

7. The invention defined in claim 6 and wherein said telescopic structure includes resilient means biasing the same to said extended position.

References Cited in the file of this patent

UNITED STATES PATENTS

| | | |
|---|---|---|
| 295,465 | Von Der Linden | Mar. 18, 1884 |
| 471,298 | Winlund et al. | Mar. 22, 1892 |
| 514,094 | Roper | Feb. 6, 1894 |
| 1,031,922 | Glaze et al. | July 9, 1912 |
| 1,801,032 | Woodford | Apr. 14, 1931 |
| 2,101,053 | Santina et al. | Dec. 7, 1937 |
| 2,394,897 | Cavanagh | Feb. 12, 1946 |
| 2,578,753 | Smith | Dec. 18, 1951 |
| 2,682,931 | Young | July 6, 1954 |
| 2,821,269 | Keil | Jan. 28, 1958 |
| 2,900,150 | Hirt | Aug. 18, 1959 |
| 2,980,213 | Van Zelm et al. | Apr. 18, 1961 |

FOREIGN PATENTS

| | | |
|---|---|---|
| 708,812 | Great Britain | May 12, 1954 |